United States Patent [19]

Imada et al.

[11]  4,410,784
[45]  Oct. 18, 1983

[54] METHOD FOR MODIFYING SURFACE PROPERTIES OF A DISC-LIKE SHAPED ARTICLE OF A VINYL CHLORIDE-BASED RESIN

[75] Inventors: Kiyoshi Imada, Omiya; Susumu Ueno, Ibaraki; Yasuhide Nishina, Ibaraki; Hirokazu Nomura, Ibaraki, all of Japan

[73] Assignee: Shin-Etsu Chemical Co., Ltd., Tokyo, Japan

[21] Appl. No.: 230,070

[22] Filed: Jan. 29, 1981

[30] Foreign Application Priority Data

Feb. 7, 1980 [JP] Japan .................................. 55-14062
Feb. 7, 1980 [JP] Japan .................................. 55-14063

[51] Int. Cl.$^3$ ............................................... B23K 9/00
[52] U.S. Cl. ...................... 219/121 PY; 219/121 PR; 219/121 PX; 361/213; 264/22; 425/810
[58] Field of Search ...... 219/121 PY, 121 P, 121 PR, 219/121 PM, 121 PX; 361/212, 213; 264/1.4, 22, 106, 107; 425/810

[56] References Cited

U.S. PATENT DOCUMENTS 4,012,666  3/1977  Schramm et al. .................... 361/213
4,048,667  9/1977  Brennecke .......................... 361/213
4,157,931  6/1979  Bricot et al. ...................... 264/106
4,230,515 10/1980  Zajac .............................. 219/121 PD

FOREIGN PATENT DOCUMENTS 645292  1/1979  U.S.S.R. ............................ 361/213

*Primary Examiner*—M. H. Paschall
*Attorney, Agent, or Firm*—Toren, McGeady and Stanger

[57] ABSTRACT

The invention provides a novel method for modifying the surface properties, e.g. antistatic performance and anti-wearing resistance, of a disc-like shaped article made of a vinyl chloride-based resin such as a gramophone record by treating with low temperature plasma so as that the surface of the record is rendered antistatic and the noise generation in playing of the record is remarkably decreased. Different from conventional methods, a great uniformity of the effect by the plasma treatment is ensured by the inventive method all over the surface of the record since the record is transferred through the space between two parallel arrays of electrodes, preferably, with rotation around its axis during the plasma treatment. The manner of connecting the electrodes to the terminals of the high frequency generator may be in two different ways. For example, all of the electrodes in one array are connected to the grounded terminal while all of the electrodes in the other array are connected to the power-input terminal. Alternatively, each of the electrodes is connected to a terminal different from that to which both of the neighboring electrodes in the same array and the electrode in the other array oppositely facing it are connected. The record after the plasma treatment is preferably coated with a surface active agent and dried to enhance the effectiveness.

6 Claims, 2 Drawing Figures

METHOD FOR MODIFYING SURFACE PROPERTIES OF A DISC-LIKE SHAPED ARTICLE OF A VINYL CHLORIDE-BASED RESIN

BACKGROUND OF THE INVENTION

The present invention relates to a method for modifying surface properties of a disc-like shaped article of a vinyl chloride-based resin or, more particularly, to a method for improving the surface properties, e.g. antistatic performance, anti-wearing resistance and the like, of a disc-like shaped article such as gramophone records and video disc made of a vinyl chloride-based resin.

As is well known, most of the gramophone records now commercially on the market are shaped with a vinyl chloride-based resin such as a copolymeric resin or vinyl chloride and vinyl acetate. In contrast to the advantages inherent to these vinyl chloride-based resins as a material for gramophone records, the largest defect in these gramophone records is that they are readily charged electrostatically to attract dusts or other tiny particles floating in the air causing remarkable noise generated when the record is played.

In order to reduce the electrostatic charging on the surface of a gramophone record, there have been proposed several methods in which an antistatic agent is incorporated into the resin compound prior to shaping of the record or the surface of a record is coated with an antistatic agent. The former method, i.e. incorporation of an antistatic agent into the resin compound, is not satisfactory because of the relatively low antistatic effect if not to mention the degraded moldability of the resin compound into a record. The latter method is, on the other hand, defective because the antistatic effect obtained by the method is poorly durable and rapidly lost by repeated playing of the gramophone record. In addition, uniform coating with an antistatic agent is hardly obtained in general because of the relatively low affinity of the antistatic agent to the surface of the gramophone record. When a large volume of an organic solvent is added to the coating agent with an object to improve the affinity therebetween, noise generation is increased and the quality of the sound is badly affected in the playing of the record.

The inventors have continued investigations to solve the above problems in the surface properties of gramophone records and proposed a method previously that the antistatic performance of a record can greatly be improved by treating the record with low temperature plasma of a low pressure gas.

This method of plasma treatment is indeed effective but still has a problem in the non-uniform improvement of the surface properties all over the surface of a record. That is, the antistatic effect obtained in the plasma treatment by holding the record between a set of electrodes for plasma generation is not uniform and considerably differ from portion to portion on the surface of the record. When the extent of the plasma treatment is increased so far not to leave a portion of insufficient effect of plasma treatment, certain portions have unavoidably received excessive effects of the plasma treatment leading to rather increased noise generation contrary to the object. Further, the antistatic effects on both sides of a gramophone record usually cannot be equal in the conventional procedure of the plasma treatment.

SUMMARY OF THE INVENTION

It is therefore an object of the present invention to provide a novel and improved method for the plasma treatment of a gramophone record or other disc-like shaped article of a vinyl chloride-based resin according to which the effectiveness and uniformity of the effects by the low temperature plasma treatment can greatly be improved with respect to the antistatic performance and the anti-wearing resistance of the record surface leading to noticeably decreased noise generation in the playing of the record.

The method of the present invention established as a result of the intensive investigations undertaken by the inventors with the above mentioned object comprises transferring a gramophone record shaped of a vinyl chloride-based resin through a space between two parallel arrays of electrodes with the surface of the record substantially in parallel to the arrays of the electrodes, each of the electrodes in the first array facing one of the electrodes in the second array and each of the electrodes in the first array being connected to the terminal of a high frequency generator of different polarity from the terminal to which the oppositely facing electrode in the second array is connected, and generating low temperature plasma in the space between the arrays of the electrodes kept under a pressure of 0.001 to 10 Torr or, preferably, 0.01 to 1 Torr of an inorganic gas by supplying a high frequency electric power to the sets of the electrodes while the gramophone record is being transferred through the space between the arrays of the electrodes.

It is preferable that the gramophone record is rotated around its axis while under transferring so as that the uniformity of the effect imparted by the plasma treatment is further improved.

The manner in which each of the electrodes is connected to a terminal of the high frequency generator may be different in two ways. In an embodiment, for example, all of the electrodes in one electrode array are connected to the same terminal, e.g. grounded terminal, of the generator and all of the electrodes in the other electrode array are connected to the other terminal, e.g. power-input terminal, of the generator. The electrode connection of this type is called a parallel electrode connection hereinafter.

In an alternative embodiment, each of the electrodes in one electrode array is connected to a different terminal of the generator from that to which both of the neighboring electrodes in the same array are connected so as that each of the electrodes in one array has the same polarity as the two electrodes diagonally positioned in the other array but has a different polarity from the electrode in the other array facing just in front. The electrode connection of this type is called a crossing electrode connection hereinafter. This type of electrode connection is preferred when the effects of the plasma treatment on both sides of the record are desired to be equalized.

DETAILED DESCRIPTION OF THE PREFERRED EMBODIMENTS

Figure 1:
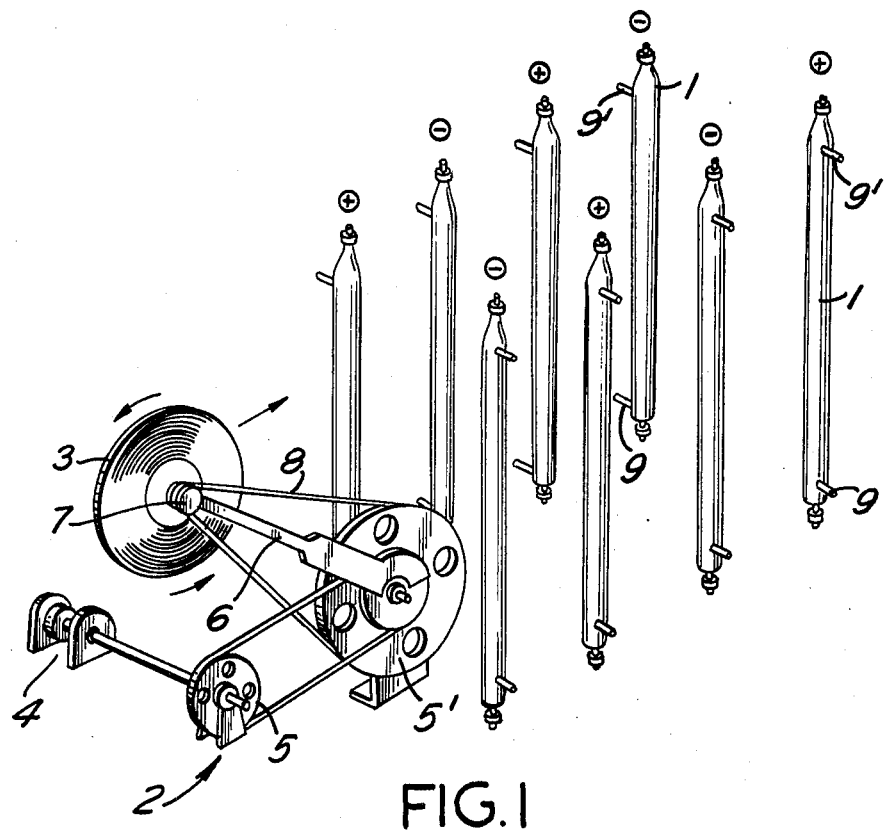
FIGS. 1 and 2 show two embodiments of the plasma electrode arrays disclosed.
Figure 2:
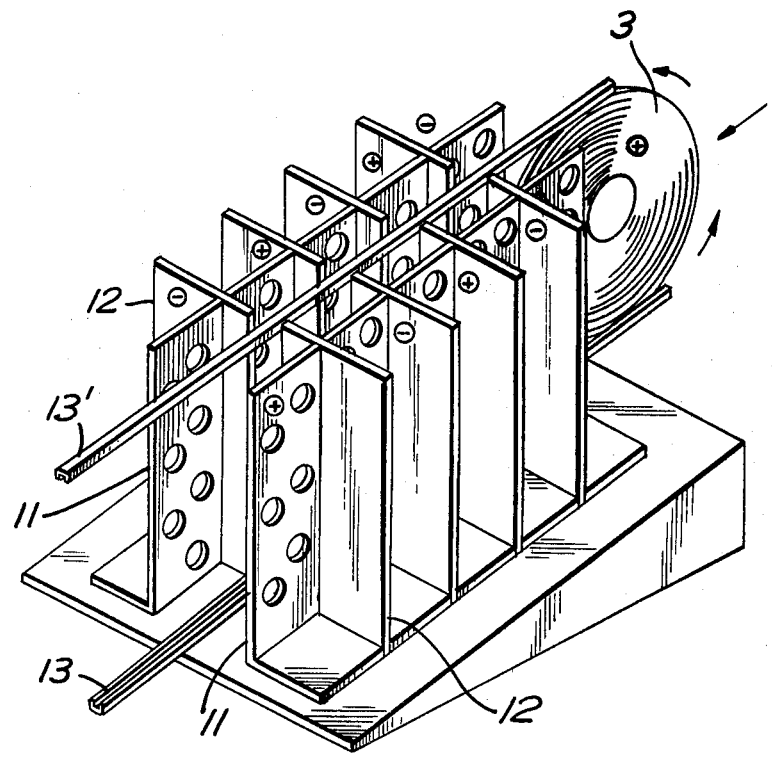

The above mentioned electrodes in two arrays are placed and fixed in a plasma chamber which can be evacuated to vacuum. The configuration of the electrode is not particularly limitative and may be rod-like, columnar, tubular, plate-like and the like. The material of the electrode should of course be electroconductive and is usually a metal such as stainless steel, copper, aluminum and the like. It is preferable that the surface of the electrode is glass-lined or coated with a porcelain enamel so as that the inadvertent or occasional sparking between the electrodes can be decreased which sometimes may take place on an exposed metal surface and adversely affect the surface properties of the gramophone record under treatment leading to increased noise generation in playing of the record.

It is also preferable that each of the electrodes is provided with a cooling means to avoid excessive temperature elevation on the electrode surface which may adversely affect the gramophone record under treatment. In this respect, it is convenient that the electrode is a tubular body having openings for inlet and outlet and cooling water is passed therethrough so that the surface temperature of the electrode can be kept, for example, at 60° C. or below.

The electrodes as described above are arranged in two rows to form the electrode arrays composed of the same number of the electrodes. Each of the electrode arrays is formed of a plural number of the electrodes arranged in parallel with each other so as to define a plane of the array. The distance between the electrode arrays should be sufficiently small to ensure stability in the plasma discharge by the application of a high frequency electric voltage but wide enough not to be contacted with the gramophone record under transferring. It is preferable that the distance between adjacent electrodes in the same array is equal to or larger than the distance between the electrodes in the different arrays oppositely facing each other.

As a matter of course, the plasma chamber should be provided with a means for transferring the gramophone record through the space between the electrode arrays. The means can be achieved with any conventional mechanics and the mechanic should desirably be provided with a contrivance to rotate the gramophone record around its axis while the record is transferred between the electrode arrays. Most simply, the record is rolled down as being held between and along two inclined guide rails installed in the upper and lower portions of the space between the electrode arrays so as that the transferring and rotation of the record are simultaneously obtained. When a higher accuracy is desired in the control of the velocities in transferring and rotation, a more elaborate mechanic may be necessary. For example, the gramophone record is held on a rotating pivotal shaft at the center hole thereof at the end of an arm swaying back and forth between the electrode arrays so as to be transferred by the movement of the arm end through the space between the electrode arrays with simultaneous rotation.

The length or span of the electrode array and the velocities of the transferring and rotation of the gramophone record under treatment are interrelated parameters and should be determined to ensure uniformity in the effect of the plasma treatment during the treating time which usually lasts for several seconds to several tens of minutes. For example, it is desirable that the record is rotated by at least one revolution during the treating time.

The manner of the connection of the electrodes to the terminals of the high frequency generator is basically either the parallel electrode connection or the crossing electrode connection as is mentioned before. Several modifications are possible, however, in the electrode connection. For example, the electrodes in an array are grouped by twos of the two adjacent ones and the thus grouped two electrodes are connected to the same generator terminals as if they are equivalent to a single electrode.

The inventive method is applicable to any gramophone records or other disc-liked shaped articles provided that they are made of a vinyl chloride-based resin. The vinyl chloride-based resins include both of the homopolymeric vinyl chloride resins and various kinds of copolymeric resins mainly composed of vinyl chloride copolymerized with one or more of copolymerizable monomers such as vinyl acetate, ethylene, propylene, acrylic and methacrylic acids and esters thereof and the like. Graft copolymers mainly composed of a vinyl chloride resin are also suitable.

The gramophone records and other disc-like shaped articles are molded with a composition of the above mentioned vinyl chloride-based resin compounds with various kinds of additive ingredients such as plasticizers, antistatic agents, stabilizers, lubricants, coloring agents and the like according to need. Suitable plasticizers are exemplified by phthalic esters, esters of aliphatic dibasic acids, esters of glycols, fatty acid esters, esters of phosphoric acid and esters of citric acid as well as epoxy-based plasticizers, polyester-based plasticizers, urethane-based plasticizers and reactive plasticizers.

The antistatic agents to be compounded with the vinyl chloride-based resin are exemplified by cationic surface active agents such as primary amine compounds, tertiary amine compounds, quaternary ammonium compounds, pyridine derivatives and the like; anionic surface active agents such as soaps, sulfonated oils, sulfonated ester oils, sulfonated amide oils, sulfuric acid ester salts of olefins, sulfuric acid ester salts of aliphatic alcohols, ester salts of alkylsulfuric acids, ethylsulfonate salts of fatty acids, salts of alkylsulfonic acids, salts of alkylnaphthalenesulfonic acids, salts of alkylbenzenesulfonic acids, succinate esters of sulfonic acids, esters of phosphoric acid and the like; non-ionic surface active agents such as fatty acid esters of polyvalent alcohols, addition products of ethylene oxide with aliphatic alcohols, with aliphatic amino or amide compounds, with alkylphenols, with alkylnaphthols and with partial esters of polyvalent alcohols and fatty acids, polyethyleneglycols and the like; and amphoteric surface active agents such as esters of polybasic carboxylic acids, imidazoline derivatives and the like.

Further, stabilizers are exemplified by metal soaps such as calcium stearate, zinc stearate, cadmium stearate, lead stearate, barium stearate and the like; organotin compounds such as dibutyltin dilaurate, di(n-octyl)tin dimaleate, di(n-octyl)tin mercaptide and the like; and lead-containing stabilizers such as tribasic lead sulfate, dibasic lead phosphite and the like and the lubricants are exemplified by ester compounds such as butyl stearate, aliphatic amide compounds such as ethylene bisstearoamide and the like, higher fatty acids and esters thereof and polyethylene waxes.

It is of course optional that the resin composition may be formulated with other kinds of additive ingredients conventionally used in fabricating vinyl chloride resin articles including fillers, anti-oxidants, ultraviolet absorbers, anti-fogging agents, pigments, dyes, crosslinking aids and the like.

The conditions for generating low temperature plasma in the plasma chamber are well known in the art. That is, the plasma chamber, in which the gramophone record to be treated is held by a mechanic for transferring and rotating, is evacuated and the atmosphere inside the chamber is kept under a pressure from 0.001 to 10 Torr or, preferably, from 0.01 to 1 Torr by passing an inorganic gas of reduced pressure while an electric power of a few watts to several kilowatts is supplied to the electrodes at a frequency of, for example, 13.56 MHz. The time for the plasma treatment may differ widely depending on the electric power or other parameters but a treatment for a few seconds to several minutes is usually sufficient. The frequency of the electric power is not limited to the above mentioned high frequency but may be in the range from direct current or low frequencies to microwave range although the high frequency band is recommended owing to the stability of the plasma discharge. Low temperature plasma is generated by glow discharge in most cases but may be obtained also by corona discharge, spark discharge and silent discharge.

The inorganic gas for the plasma atmosphere should be inert to the article under treatment and exemplified by inorganic gases such as helium, neon, argon, nitrogen, nitrous oxide, nitrogen dioxide, oxygen, air, chlorine, hydrogen chloride, carbon monoxide, carbon dioxide, hydrogen and the like. They are used either alone or as a mixture of two kinds or more.

By the above described treatment with low temperature plasma, the surface of the gramophone record or the like shaped article is rendered antistatic and imparted with sufficient affinity to water. When higher effectiveness and durability of the effects obtained by the plasma treatment are desired, it is preferable that the surface having been treated with the low temperature plasma is brought into contact with an aqueous solution containing a surface active agent in a concentration from 0.001 to 50% by weight so as that the surface active agent is immobilized on the surface activated by the low temperature plasma treatment to exhibit durable antistatic effect. That is, the gramophone record taken out of the plasma chamber after completion of the plasma treatment is dipped in or coated with the aqueous solution containing a surface active agent and dried. The type of the surface active agent is not particularly limitative and may be cationic, anionic, non-ionic or amphoteric but the most preferred are cationic surface active agents owing to the higher antistatic effect obtained therewith. Generally, coating by spraying is the most convenient way from the practical standpoint. The spreadability of the aqueous solution on the surface of the plasma-treated gramophone record can be improved by adding a water-miscible organic solvent such as methyl alcohol, ethyl alcohol and the like to the solution. In any way, the surface of the plasma-treated record is coated uniformly with the aqueous solution by virtue of the affinity to water imparted by the plasma treatment to exhibit durable antistatic effect with no adverse effect in the noise generation in the playing of the record.

Following are the examples to illustrate the procedure and effectiveness of the invention method in further detail. In the examples, the effectiveness of the plasma treatment was evaluated in four ways, i.e. the cigarette ash attraction test, measurement of the surface resistivity, measurement of the electrostatic voltage induced by rubbing and measurement of the number of click noises when the record was played. The particulars of the measurements were as follows.

Cigarette ash attraction test: the surface of the record was rubbed manually with a dry cotton cloth repeatedly to induce electrostatic charge and the thus charged surface was brought at a distance of 3 cm from cigarette ash to find whether the ash was attracted by the charged surface or not. The results were recorded in the minimum number of rubbing with which attraction of the cigarette ash was first observed. For example, the data given as "1 time" mean that the cigarette ash was attracted by the surface rubbed only one time and "more than 500 times" means that repeated rubbing of as many as 500 times or more resulted in no attraction of the cigarette ash by the thus rubbed record surface. The measurement was carried out at 25° C. with a relative humidity of 50%.

Surface resistivity: measurement was carried out at 25° C. with a relative humidity of 50%.

Electrostatic voltage induced by rubbing: a rotary static tester was used at 25° C. with a relative humidity of 50% by rubbing with a cotton cloth under a load of 200 g for 30 seconds at 700 r.p.m.

Number of click noises: the amplifier operation level was subsonic filter 15 Hz; tone control based (⊖) max; tone defeat 125 Hz; volume level 14; and class A operation. The recorder condition was with full scale 1 mV/cm and the number of the signals of 1/18 mV/cm or larger was counted as the click noises.

In all of the following examples, the gramophone records of 30 cm diameter were prepared by molding a composition composed of 100 parts by weight of a copolymeric resin of vinyl chloride and vinyl acetate, 1.0 part by weight of an epoxy-modified soybean oil, 1.0 part by weight of dibutyltin mercaptide and 0.3 part by weight of calcium stearate in a record press by pre-heating at 140° C. and pressing at 165° C.

EXAMPLE 1. (Experiments No. 1-1 to No. 1-3)

The record was transferred through the space between two electrode arrays in a plasma chamber and connected to the terminals of a high frequency generator operating at 13.56 MHz in the parallel electrode connection. Low temperature plasma was generated by supplying an electric power of 500 watts to the sets of the electrodes while the atmosphere inside the plasma chamber was kept at a pressure of 0.15 Torr by passing argon gas. The record was transferred between the electrode arrays taking 10 seconds during which it was rotated 5 times.

The thus plasma-treated gramophone record was coated with a diluted aqueous solution of a cationic surface active agent by spraying and air-dried. The results of the measurements undertaken with this gramophone record treated with low temperature plasma and the surface active agent (Experiment No. 1-3) are shown in Table 1.

For comparison, the same measurements were undertaken with a gramophone record before the plasma treatment but treated with the surface active agent (Experiment No. 1-1) and the results are also shown in the table.

For further comparison, the gramophone record was treated in the same manner as in Experiment No. 1-3 except that the record was not transferred and not rotated but merely fixedly held between the electrode arrays (Experiment No. 1-2). The results of the measurements are shown in the table.

The data shown in the table for Experiments No. 1-2 and No. 1-3 were obtained with the surface which faced the array of the electrodes connected to the power-input terminal of the high frequency generator during the plasma treatment.

EXAMPLE 2. (Experiments No. 2-1 and No. 2-2)

The experimental procedure was substantially the same as in Experiment No. 1-3 excepting that the pressure of the argon atmosphere was 0.1 Torr, the high frequency electric power supply was increased to 1000 watts and the time of the plasma treatment was 5 seconds to give 2 revolutions of the record (Experiment No. 2-2).

For comparison, the same experimental procedure was repeated except that the gramophone record was not transferred and not rotated but merely fixedly held between the electrode arrays (Experiment No. 2-1).

The results of the measurements undertaken with these records are shown in Table 1. The data for these experiments were taken with the surface which faced the array of the electrodes connected to the power-input terminal of the high frequency generator.

EXAMPLE 3. (Experiments No. 3-1 and No. 3-2)

The experimental procedure was substantially the same as in Experiment No. 1-3 except that the pressure of the argon atmosphere was 0.3 Torr, the high frequency electric power was increased to 1000 watts and the time of the plasma treatment was 3 seconds during which the record was rotated to give 3 revolutions (Experiment No. 3-2).

For comparison, the same experimental procedure was repeated except that the gramophone record was not transferred and not rotated but merely fixedly held between the electrode arrays (Experiment No. 3-1).

The results of the measurements undertaken with these records and shown in Table 1 were obtained with the surface which faced the array of the electrodes connected to the power-input terminal of the high frequency generator during the plasma treatment.

EXAMPLE 4. (Experiments No. 4-1 to No. 4-4)

Experimental procedure was substantially the same as in Experiment No. 1-3 except that the pressure of the argon atmosphere was 0.2 Torr and the time of the plasma treatment was varied as 20 seconds, 30 seconds, 1 minute and 3 minutes in Experiments No. 4-1 to No. 4-4, respectively, with the number of revolution of the record rotation equal to 5 in each of the experiments.

The results of the measurements undertaken with these records and shown in Table 1 were obtained with the surface which faced the array of the electrodes connected to the power-input terminal of the high frequency generator during the plasma treatment.

EXAMPLE 5. (Experiments No. 5-1 to No. 5-4)

Experimental procedure was substantially the same as in Experiment No. 1-3 except that the pressure of the argon atmosphere was 0.2 Torr and the number of revolution of the record rotation was varied during 10 seconds of the plasma treatment. In Experiment No. 5-1, the record was not rotated and merely transferred between the electrode arrays and the number of revolution of the record was 1, 5 or 10 revolutions in Experiments No. 5-2, No. 5-3 and No. 5-4, respectively.

The results of the measurements undertaken with these records and shown in Table 1 were obtained with the surface which faced the array of the electrodes connected to the power-input terminal of the high frequency generator during the plasma treatment.

TABLE 1

| Experiment No. | Cigarette ash attraction test, times | Surface resistivity, ohm | Charge voltage by rubbing, volts | Click noise, times |
|---|---|---|---|---|
| 1-1 | 1 | $7 \times 10^{14}$ | 8200 | 15 |
| 1-2 | more than 500 | $5 \times 10^{11}$ | 900 | 63 |
| 1-3 | more than 500 | $3 \times 10^{10}$ | 620 | 17 |
| 2-1 | more than 500 | $6 \times 10^{11}$ | 820 | 56 |
| 2-2 | more than 500 | $3 \times 10^{10}$ | 780 | 15 |
| 3-1 | more than 500 | $6 \times 10^{11}$ | 880 | 60 |
| 3-2 | more than 500 | $4 \times 10^{10}$ | 640 | 19 |
| 4-1 | more than 500 | $7 \times 10^{10}$ | 580 | 20 |
| 4-2 | more than 500 | $6 \times 10^{10}$ | 500 | 22 |
| 4-3 | more than 500 | $6 \times 10^{10}$ | 380 | 29 |
| 4-4 | more than 500 | $3 \times 10^{10}$ | 300 | 37 |
| 5-1 | more than 500 | $8 \times 10^{10}$ | 810 | 28 |
| 5-2 | more than 500 | $7 \times 10^{10}$ | 720 | 24 |
| 5-3 | more than 500 | $3 \times 10^{10}$ | 650 | 20 |
| 5-4 | more than 500 | $3 \times 10^{10}$ | 610 | 17 |

EXAMPLE 6. (Experiments No. 6-1 to No. 6-3)

Substantially the same experimental procedure was repeated as in Experiment No. 1-3 except that the pressure of the argon atmosphere was 0.1 Torr and the gramophone record was not rotated during its transfer through the space between the arrays of the electrodes, which were connected to the high frequency generator in the crossing electrode connection instead of the parallel electrode connection (Experiment No. 6-3).

For comparison, the same procedure as in the above experiment No. 6-3 was repeated without transferring the record between the electrode arrays but merely holding it fixedly between the arrays of the electrodes (Experiment No. 6-1).

For further comparison, the procedure in the above experiment No. 6-3 was repeated with the electrodes connected to the high frequency generator in the parallel electrode connection instead of the crossing connection (Experiment No. 6-2).

The results of the measurements undertaken with these gramophone records are shown in Table 2 below in which the data for Experiment No. 6-2 were obtained with the surface which faced the array of the electrodes connected to the power-input terminal of the generator during the plasma treatment. Meanwhile, no noticeable differences were found between both sides of the records obtained in Experiments No. 6-1 and No. 6-3.

Example 7. (Experiments No. 7-1 to No. 7-3)

The experimental procedure was substantially the same as in Experiment No. 6-3 above except that the pressure of the argon atmosphere was 0.2 Torr and the gramophone record was rotated during its transfer between the electrode arrays taking 10 seconds. The number of revolution of the record was 1, 5 or 10 revolutions in Experiments No. 7-1 to No. 7-3, respectively. The results of the measurement undertaken with these gramophone records are shown in Table 2.

EXAMPLE 8. (Experiments No. 8-1 and No. 8-2)

The experimental procedure was substantially the same as in Experiment No. 6-3 except that the pressure of the argon atmosphere was 0.5 Torr and the electric power was increased to 1000 watts. The record was rotated to give 2 revolutions during 10 seconds of the time for the plasma treatment (Experiment No. 8-2).

For comparison, the same experimental procedure as in Experiment No. 8-2 above was repeated except that the electrodes were connected to the terminals of the high frequency generator in the parallel electrode connection instead of the crossing electrode connection in Experiment No. 8-2 (Experiment No. 8-1).

The results of the measurements undertaken with these gramophone records are shown in Table 2, in which the data for Experiment No. 8-1 were obtained with the surface which faced the array of the electrodes connected to the power-input terminal of the generator during the plasma treatment.

Example 9. (Experiments No. 9-1 to No. 9-3)

The same experimental procedure was repeated as in Experimet No. 6-3 except that the record was given 2 revolutions during 10 seconds of the plasma treatment (Experiment No. 9-3).

For comparison, the same experimental procedure as in Experiment No. 9-3 above was repeated except that the gramophone record was not transferred and not rotated but merely held fixedly between the arrays of the electrodes (Experiment No. 9-1).

For further comparison, the same experimental procedure as in Experiment No. 9-3 above was repeated except that the electrodes were connected to the terminals of the high frequency generator in the parallel electrode connection instead of the crossing electrode connection in Experiment No. 9-3 (Experiment No. 9-2).

TABLE 2

| Experiment No. | Cigarette ash attraction test, times | Surface resistivity, ohm | Charge voltage by rubbing, volts | Click noise, times |
| --- | --- | --- | --- | --- |
| 6-1 | more than 500 | $5 \times 10^{11}$ | 930 | 64 |
| 6-2 | more than 500 | $4 \times 10^{10}$ | 810 | 39 |
| 6-3 | more than 500 | $4 \times 10^{10}$ | 590 | 25 |
| 7-1 | more than 500 | $6 \times 10^{10}$ | 380 | 15 |
| 7-2 | more than 500 | $3 \times 10^{10}$ | 310 | 14 |
| 7-3 | more than 500 | $3 \times 10^{10}$ | 310 | 12 |
| 8-1 | more than 500 | $7 \times 10^{10}$ | 650 | 19 |
| 8-2 | more than 500 | $3 \times 10^{10}$ | 320 | 15 |

TABLE 3

| Experiment No. | Side | Cigarette ash attraction test, times | Surface resistivity, ohm | Charge voltage by rubbing, volts | Click noise, times |
| --- | --- | --- | --- | --- | --- |
| 9-1 | A | more than 500 | $5 \times 10^{11}$ | 900 | 66 |
|  | B | more than 500 | $6 \times 10^{11}$ | 950 | 63 |
| 9-2 | A | more than 500 | $7 \times 10^{10}$ | 640 | 21 |
|  | B | more than 500 | $9 \times 10^{10}$ | 890 | 29 |
| 9-3 | A | more than 500 | $4 \times 10^{10}$ | 450 | 12 |
|  | B | more than 500 | $4 \times 10^{10}$ | 470 | 13 |

The results of the measurements undertaken with these gramophone records for both surfaces, i.e. side A and side B, are shown in Table 3 below. In Experiment No. 9-2 in which the unsymmetrical plasma treatment was effected, the side which faced the array of the electrodes connected to the power-input terminal of the high frequency generator is named as side A and the reverse side which faced the array of the electrodes connected to the grounded terminal of the generator is named as side B.

Example 10. (Experiments No. 10-1 to No. 10-4)

The conditions for the plasma treatment were substantially the same as in Experiment No. 3-2 except that the pressure of the argon atmosphere was 0.15 Torr and the electric power was 500 watts. In order to examine the influence of the types of the surface active agents applied to the plasma-treated surface of the record, the plasma-treated record was coated with a 5% aqueous solution of either one of a cationic, anionic, non-ionic and amphoteric surface active agents followed by drying.

Measurements were undertaken with the record as plasma-treated and the four records plasma-treated and coated with the surface active agents to give the results shown in Table 4 below (Experiment No. 10-4).

For comparison, the gramophone records before the plasma treatment were coated with the surface active agents in the same manner as above (Experiments No. 10-1) and subjected to the measurements to give the results shown in Table 4.

For further comparison, the same experimental procedure of the plasma treatment and coating with the surface active agents was repeated except that the record was not transferred and not rotated but merely held fixedly between the electrode arrays (Experiment No. 10-2). The results of the measurements are shown in Table 4.

For still further comparison, the same experimental procedure was repeated as in Experiment No. 10-4 except that the electrodes were connected to the terminals of the high frequency generator in the parallel electrode connection instead of the crossing electrode connection in Experiment No. 10-4 (Experiment No. 10-3). The results of the measurements shown in Table 4 were obtained for the surface which faced the array of the electrodes connected to the power-input terminal of the generator during the plasma treatment.

To examine the durability of the effects of the treatment above described, the gramophone records were stored for 6 months and the measurements were repeated to give the results shown in Table 5 below.

TABLE 4

| Experiment No. | Surface active agent | Cigarette ash attraction test, times | Surface resistivity, ohm | Charge voltage by rubbing, volts | Click noise, times |
|---|---|---|---|---|---|
| 10-1 | Cationic | 1 | $7 \times 10^{14}$ | 8200 | 15 |
|  | Anionic | 1 | $7 \times 10^{14}$ | 8200 | 15 |
|  | Non-ionic | 1 | $7.5 \times 10^{14}$ | 8200 | 15 |
|  | Amphoteric | 1 | $7 \times 10^{14}$ | 8200 | 15 |
|  | None | 1 | $8 \times 10^{14}$ | 8250 | 15 |
| 10-2 | Cationic | more than 500 | $3 \times 10^{11}$ | 930 | 66 |
|  | Anionic | more than 500 | $5 \times 10^{11}$ | 900 | 73 |
|  | Non-ionic | more than 500 | $7.5 \times 10^{11}$ | 1200 | 80 |
|  | Amphoteric | more than 500 | $6 \times 10^{12}$ | 1500 | 82 |
|  | None | more than 500 | $8 \times 10^{12}$ | 2200 | 88 |
| 10-3 | Cationic | more than 500 | $5 \times 10^{10}$ | 580 | 18 |
|  | Anionic | more than 500 | $4 \times 10^{10}$ | 590 | 18 |
|  | Non-ionic | more than 500 | $8 \times 10^{10}$ | 690 | 21 |
|  | Amphoteric | more than 500 | $9 \times 10^{10}$ | 800 | 23 |
|  | None | more than 500 | $4 \times 10^{11}$ | 1600 | 24 |
| 10-4 | Cationic | more than 500 | $3 \times 10^{10}$ | 290 | 15 |
|  | Anionic | more than 500 | $3 \times 10^{10}$ | 300 | 15 |
|  | Non-ionic | more than 500 | $5 \times 10^{10}$ | 420 | 19 |
|  | Amphoteric | more than 500 | $8 \times 10^{10}$ | 530 | 20 |
|  | None | more than 500 | $2 \times 10^{11}$ | 1300 | 21 |

TABLE 5

| Experiment No. | Surface active agent | Cigarette ash attraction test, times | Surface resistivity, ohm | Charge voltage by rubbing, volts | Click noise, times |
|---|---|---|---|---|---|
| 10-1 | Cationic | 1 | $7 \times 10^{14}$ | 8200 | 15 |
|  | Anionic | 1 | $7 \times 10^{14}$ | 8200 | 15 |
|  | Non-ionic | 1 | $7 \times 10^{14}$ | 8200 | 15 |
|  | Amphoteric | 1 | $7 \times 10^{14}$ | 8200 | 15 |
|  | None | 1 | $7.5 \times 10^{14}$ | 8250 | 15 |
| 10-2 | Cationic | more than 500 | $3.5 \times 10^{11}$ | 950 | 66 |
|  | Anionic | more than 500 | $8 \times 10^{11}$ | 1300 | 73 |
|  | Non-ionic | more than 500 | $1.0 \times 10^{12}$ | 2020 | 80 |
|  | Amphoteric | more than 500 | $9 \times 10^{12}$ | 2850 | 82 |
|  | None | more than 500 | $1 \times 10^{13}$ | 3500 | 88 |
| 10-3 | Cationic | more than 500 | $6 \times 10^{10}$ | 620 | 18 |
|  | Anionic | more than 500 | $5 \times 10^{10}$ | 670 | 18 |
|  | Non-ionic | more than 500 | $9 \times 10^{10}$ | 910 | 21 |
|  | Amphoteric | more than 500 | $1 \times 10^{11}$ | 1010 | 28 |
|  | None | 200 | $7 \times 10^{11}$ | 2800 | 29 |
| 10-4 | Cationic | more than 500 | $3 \times 10^{10}$ | 300 | 15 |
|  | Anionic | more than 500 | $5 \times 10^{10}$ | 380 | 15 |
|  | Non-ionic | more than 500 | $8 \times 10^{10}$ | 500 | 19 |
|  | Amphoteric | more than 500 | $9 \times 10^{10}$ | 700 | 24 |
|  | None | 300 | $5 \times 10^{11}$ | 2000 | 25 |

What is claimed is:

1. A method for modifying surface properties of a disc-like shaped article made of a vinyl chloride-based resin by exposing the surface to low temperature plasma which comprises transferring the disc-like shaped article through a space between a first and a second parallel array of electrodes with surface of the disc-like shaped article substantially in parallel to the arrays of the electrodes, each of the electrodes in the first array oppositely facing one of the electrodes in the second array and each of the electrodes in the first array being connected to the terminal of a high frequency generator of a different polarity from the terminal to which the oppositely facing electrode in the second array is connected, and each of the electrodes in an array of the electrodes being connected to a terminal of the high frequency generator having a polarity different from the terminal to which the directly adjacent electrodes in the same array are connected, and generating low temperature plasma in the space between the arrays of the electrodes kept under a pressure of from 0.001 to 10 Torr of an inorganic gas by supplying a high frequency electric power to the arrays of the electrodes while the disc-like shaped article is being transferred through the space between the arrays of the electrodes.

2. The method as claimed in claim 1 wherein the disc-like shaped article is rotated around the axis thereof while being transferred through the space between the arrays of the electrodes.

3. The method as claimed in claim 1 wherein the electrodes in an array of the electrodes are connected in one and the same terminal of the high frequency generator.

4. The method as claimed in claim 2 wherein the disc-like shaped article undergoes at least one revolution while being transferred through the space between the arrays of the electrodes.

5. The method as claimed in claim 1 wherein the disc-like shaped article having been treated with the low temperature plasma is further coated with an aqueous solution of a surface active agent and dried.

6. The method as claimed in claim 5 wherein the surface active agent is a cationic surface active agent.

* * * * *